United States Patent
Lee et al.

(10) Patent No.: US 11,775,851 B2
(45) Date of Patent: Oct. 3, 2023

(54) USER VERIFICATION METHOD AND APPARATUS USING GENERALIZED USER MODEL

(71) Applicant: Samsung Electronics Co., Ltd., Suwon-si (KR)

(72) Inventors: Dohwan Lee, Suwon-si (KR); Kyuhong Kim, Seoul (KR); Chang Kyu Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 642 days.

(21) Appl. No.: 16/545,095

(22) Filed: Aug. 20, 2019

(65) Prior Publication Data

US 2020/0210556 A1    Jul. 2, 2020

(30) Foreign Application Priority Data

Dec. 27, 2018    (KR) .................. 10-2018-0170905

(51) Int. Cl.
*G06N 7/01*    (2023.01)
*G06F 21/31*    (2013.01)
*G06F 18/214*    (2023.01)
*G06N 3/08*    (2023.01)
*G06F 18/2411*    (2023.01)

(52) U.S. Cl.
CPC ............. *G06N 7/01* (2023.01); *G06F 18/214* (2023.01); *G06F 18/2411* (2023.01); *G06F 21/31* (2013.01); *G06N 3/08* (2013.01)

(58) Field of Classification Search
CPC ......... G06F 21/31; G06N 3/08; G06K 9/6269
See application file for complete search history.

(56) References Cited

U.S. PATENT DOCUMENTS

| | | | |
|---|---|---|---|
| 7,921,012 B2 | 4/2011 | Fujimura et al. | |
| 8,099,288 B2 | 1/2012 | Zhang et al. | |
| 9,978,374 B2 | 5/2018 | Heigold et al. | |
| 10,102,366 B2 * | 10/2018 | Finnan | G06Q 20/4014 |
| 10,386,492 B2 * | 8/2019 | Large | G01S 19/39 |
| 10,395,018 B2 * | 8/2019 | Turgeman | H04L 63/0861 |

(Continued)

FOREIGN PATENT DOCUMENTS

| | | |
|---|---|---|
| CA | 3 036 533 A1 | 3/2018 |
| KR | 10-2008-0064351 A | 7/2008 |

OTHER PUBLICATIONS

Dişken, Gökay, et al. "Speaker Model Clustering to Construct Background Models for Speaker Verification." Archives of Acoustics, 42,2017 (9 pages in English).

(Continued)

*Primary Examiner* — Viral S Lakhia
(74) *Attorney, Agent, or Firm* — NSIP Law

(57) ABSTRACT

A user verification method and apparatus using a generalized user model is disclosed, where the user verification method includes generating a feature vector corresponding to a user based on input data corresponding to the user, determining a first parameter indicating a similarity between the feature vector and an enrolled feature vector enrolled for user verification, determining a second parameter indicating a similarity between the feature vector and a user model corresponding to generalized users, and verifying the user based on the first parameter and the second parameter.

31 Claims, 10 Drawing Sheets

(56) References Cited

U.S. PATENT DOCUMENTS

| | | | |
|---|---|---|---|
| 10,417,532 B2* | 9/2019 | Liang | G06F 18/2411 |
| 10,482,225 B1* | 11/2019 | Abdulhayoglu | G06F 21/31 |
| 10,534,901 B2* | 1/2020 | Kim | G06V 10/17 |
| 10,593,336 B2* | 3/2020 | Boyadjiev | G06F 21/32 |
| 10,621,991 B2* | 4/2020 | Zhang | G06N 3/045 |
| 10,657,494 B2* | 5/2020 | Juola | G06F 40/253 |
| 10,769,256 B2* | 9/2020 | Han | G06F 21/45 |
| 10,878,072 B2* | 12/2020 | Fong | H04L 63/0861 |
| 10,957,339 B2* | 3/2021 | Cao | G06N 5/046 |
| 11,128,462 B2* | 9/2021 | Higo | H04L 9/3236 |
| 2015/0249664 A1* | 9/2015 | Talhami | H04L 63/0861 726/6 |
| 2015/0301796 A1 | 10/2015 | Visser et al. | |
| 2017/0068932 A1 | 3/2017 | Leary et al. | |
| 2018/0040323 A1 | 2/2018 | Lesso et al. | |
| 2018/0053509 A1 | 2/2018 | Kim et al. | |
| 2018/0285629 A1* | 10/2018 | Son | G06V 10/809 |
| 2019/0304472 A1* | 10/2019 | Pendyala | G10L 17/24 |
| 2019/0354787 A1* | 11/2019 | Fong | G06N 3/084 |
| 2020/0074058 A1* | 3/2020 | Son | G06N 3/088 |
| 2020/0076004 A1* | 3/2020 | Yang | H01M 4/667 |
| 2020/0210556 A1* | 7/2020 | Lee | G06F 21/31 |

OTHER PUBLICATIONS

Jati, Arindam, et al. "Speaker2Vec: Unsupervised Learning and Adaptation of a Speaker Manifold Using Deep Neural Networks with an Evaluation on Speaker Segmentation." *Interspeech*, 2017 (5 pages in English).

Li, Lantian, et al. "Decision making based on cohort scores for speaker verification." *2016 Asia-Pacific Signal and Information Processing Association Annual Summit and Conference (APSIPA)*. IEEE, 2016 (4 pages in English).

Extended European Search Report dated May 26, 2020 in counterpart European Patent Application No. 19201858.8 (12 pages in English).

Deng, Jiankang et al., "ArcFace: Additive Angular Margin Loss for Deep Face Recognition", *Proceedings of the IEEE Conference on Computer Vision and Pattern Recognition*, Feb. 9, 2019 (pp. 1-11).

Korean Office Action dated Feb. 2, 2023, in Counterpart Korean Patent Application No. 10-2018-0170905 (10 Pages in Korean, 7 Pages in English).

* cited by examiner

210

220

710

720

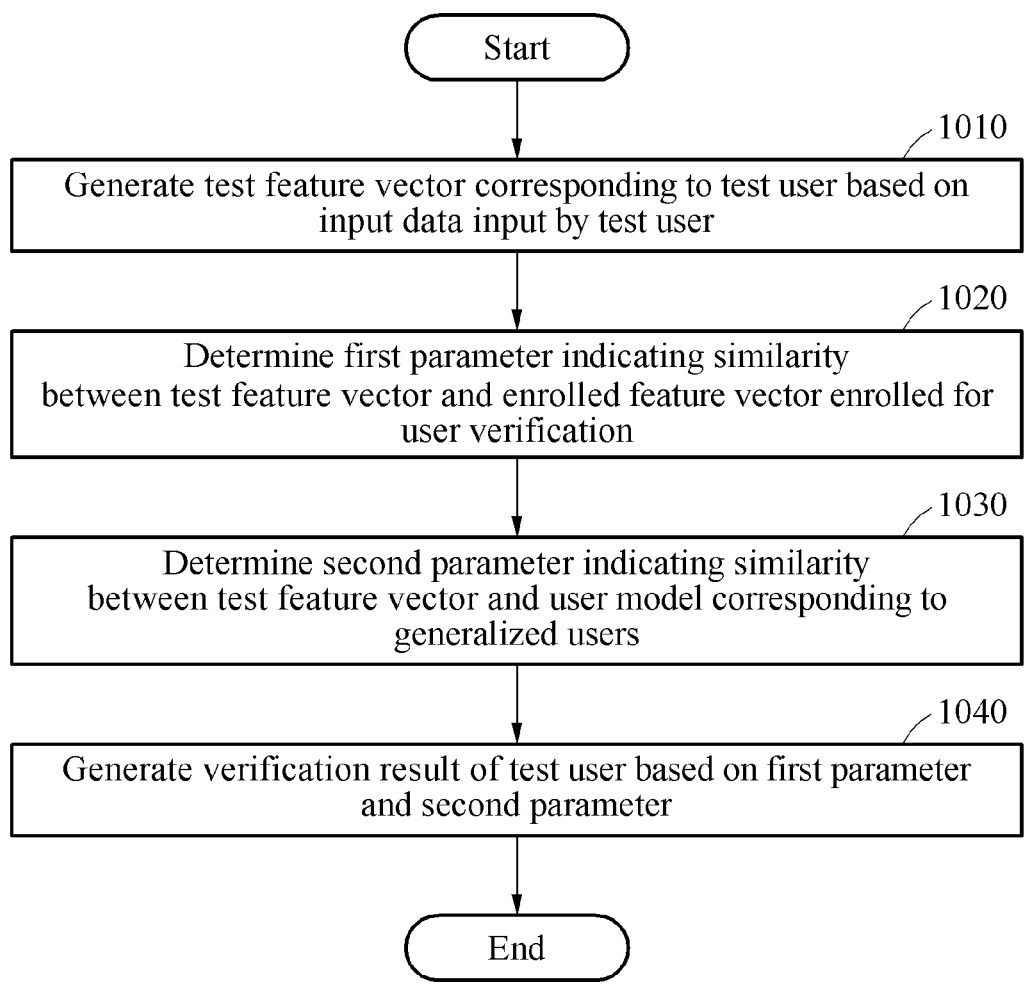

USER VERIFICATION METHOD AND APPARATUS USING GENERALIZED USER MODEL

CROSS-REFERENCE TO RELATED APPLICATIONS

This application claims the benefit under 35 USC § 119(a) of Korean Patent Application No. 10-2018-0170905 filed on Dec. 27, 2018 in the Korean Intellectual Property Office, the entire disclosure of which is incorporated herein by reference for all purposes.

BACKGROUND

1. Field

The following description relates to a user verification method and apparatus using a generalized user model.

2. Description of Related Art

Recently, to classify an input pattern as a member that belongs to a group, researchers are actively conducting research on methods of applying efficient and accurate pattern recognition. One such area of research is focused on an artificial neural network that models characteristics for pattern recognition by mathematical expressions. To classify an input pattern as a member that belongs to a group, the neural network employs an algorithm. Through this algorithm, the neural network may generate a mapping between the input pattern and output patterns. The capability of generating such a mapping may be referred to as a learning capability of the neural network. Further, the neural network may have a generalization capability of generating a relatively accurate output with respect to an input pattern that is yet to be used for learning, based on a result of prior learning.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a user verification method including generating a feature vector corresponding to a user based on input data corresponding to the user, determining a first parameter indicating a similarity between the feature vector and an enrolled feature vector enrolled for user verification, determining a second parameter indicating a similarity between the feature vector and a user model corresponding to generalized users, and generating a verification result of the user based on the first parameter and the second parameter.

The user model may include feature clusters obtained by clustering generalized feature vectors corresponding to the generalized users.

The determining of the second parameter may include selecting a portion of the feature clusters as a representative feature cluster based on a similarity between the feature vector and each of the feature clusters, and determining the second parameter based on a similarity between the feature vector and the representative feature cluster.

The determining of the second parameter may include determining the second parameter based on a Gaussian mixture model (GMM) may include the feature vector and Gaussian distributions, and the Gaussian distributions may correspond to a distribution of generalized feature vectors representing the generalized users.

The determining of the second parameter may include determining the second parameter using a neural network trained to output a similarity between a network input and the user model.

The generating of the feature vector may include generating the feature vector by extracting features from the input data using a neural network trained to extract features from an input.

The generating of the verification result of the user may include determining a confidence score based on the first parameter and the second parameter, and obtaining the verification result of the user by comparing the confidence score and a threshold.

The confidence score may increase in response to an increase in the similarity between the feature vector and the enrolled feature vector and may decrease in response to an increase in the similarity between the feature vector and the user model.

The generating of the verification result of the user may include determining a threshold based on the second parameter, and generating the verification result of the user by comparing a confidence score corresponding to the first parameter and the threshold.

The threshold may increase, in response to an increase in the similarity between the feature vector and the user model.

The first parameter may increase in response to a decrease in a distance between the feature vector and the enrolled feature vector, and the second parameter may increase in response to a decrease in a distance between the feature vector and the user model.

In another general aspect, there is provided a speaker verification method including generating a feature vector corresponding to a user by extracting a feature from speech data corresponding to the user, determining a first parameter indicating a similarity between the feature vector and an enrolled feature vector enrolled for user verification, determining a second parameter indicating a similarity between the feature vector and a user model corresponding to generalized users, and generating a verification result of the user based on the first parameter and the second parameter.

The enrolled feature vector may be based on speech data input by an enrolled user.

The feature vector may include information for identifying the user, and the enrolled feature vector may include information for identifying the enrolled user.

The user model may include feature clusters obtained by clustering generalized feature vectors corresponding to the generalized users.

The determining of the second parameter may include determining the second parameter based on a Gaussian mixture model (GMM) may include the feature vector and Gaussian distributions, and the Gaussian distributions may correspond to a distribution of generalized feature vectors representing the generalized users.

The determining of the second parameter may include determining the second parameter using a neural network trained to output a similarity between a network input and the user model.

The generating of the verification result of the user may include determining a confidence score based on the first parameter and the second parameter, and obtaining the verification result of the user by comparing the confidence score and a threshold.

The generating of the verification result of the user may include determining a threshold based on the second parameter, and generating the verification result of the user by comparing a confidence score corresponding to the first parameter and the threshold.

In another general aspect, there is provided a user verification apparatus including a processor configured to generate a feature vector corresponding to a user based on input data input by the user, determine a first parameter indicating a similarity between the feature vector and an enrolled feature vector enrolled for user verification, determine a second parameter indicating a similarity between the feature vector and a user model corresponding to generalized users, and generate a verification result of the user based on the first parameter and the second parameter.

The user model may include feature clusters obtained by clustering generalized feature vectors corresponding to the generalized users.

The processor may be configured to select a portion of the feature clusters as a representative feature cluster based on a similarity between the feature vector and each of the feature clusters, and to determine the second parameter based on a similarity between the feature vector and the representative feature cluster.

The processor may be configured to determine the second parameter based on a Gaussian mixture model (GMM) may include the feature vector and Gaussian distributions, and the Gaussian distributions correspond to a distribution of generalized feature vectors representing the generalized users.

The processor may be configured to determine the second parameter using a comparator operating based on a neural network trained to output a similarity between a network input and the user model.

The processor may be configured to generate the feature vector by extracting features from the input data using a neural network trained to extract features from an input.

The processor may be configured to determine a confidence score based on the first parameter and the second parameter, and to obtain the verification result of the user by comparing the confidence score and a threshold.

The processor may be configured to determine a threshold based on the second parameter, and to generate the verification result of the user by comparing a confidence score corresponding to the first parameter and the threshold.

The apparatus may include a memory storing instructions that, when executed, configures the processor to generate the feature vector, to determine the first parameter, to determine the second parameter, and to generate the verification result.

In another general aspect, there is provided a speaker verification apparatus including a processor, the processor configured to generate a feature vector corresponding to a user by extracting a feature from speech data corresponding to the user, determine a first parameter indicating a similarity between the feature vector and an enrolled feature vector enrolled for user verification, determine a second parameter indicating a similarity between the feature vector and a user model corresponding to generalized users, and generate a verification result of the user based on the first parameter and the second parameter.

The enrolled feature vector may be based on speech data input by an enrolled user.

The apparatus may include a memory storing instructions that, when executed, configures the processor to generate the feature vector, to determine the first parameter, to determine the second parameter, and to generate the verification result.

In another general aspect, there is provided an electronic device, including a sensor configured to receive an input from a user, a memory configured to store the input, an enrolled feature vector for user verification, a user model corresponding to generalized users, and instructions, and a processor configured to execute the instructions to implement a feature extractor configured to extract a feature vector corresponding to the user from the input, implement a first comparator configured to determine a first parameter indicating a similarity between the feature vector and the enrolled feature vector, implement a second comparator configured to determine a second parameter indicating a similarity between the feature vector and the user model, and verify the user based on the first parameter and the second parameter.

The processor may be configured to determine a confidence score based on the first parameter and the second parameter, and verify the user based on a comparison of the confidence score with a threshold.

Other features and aspects will be apparent from the following detailed description, the drawings, and the claims.

BRIEF DESCRIPTION OF THE DRAWINGS

FIG. 10 is a diagram illustrating an example of a user verification method.

Figure 1:
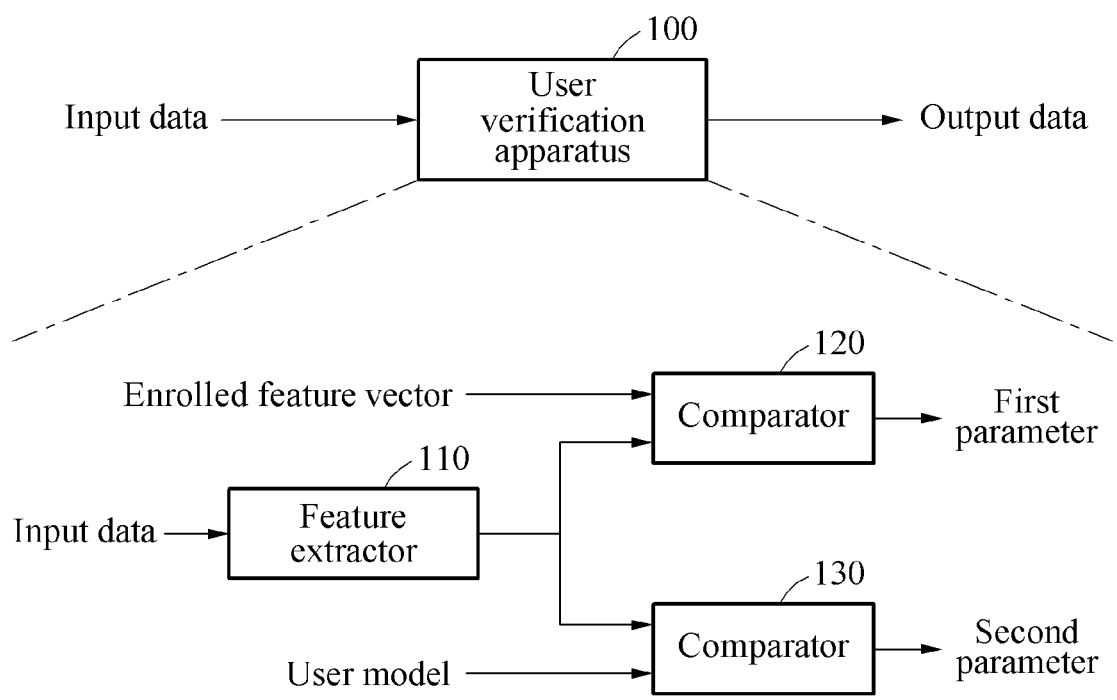
FIG. 1 illustrates an example of a user verification apparatus using a generalized user model.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

When a part is connected to another part, it includes not only a case where the part is directly connected but also a case where the part is connected with another part in between. Also, when a part includes a constituent element, other elements may also be included in the part, instead of the other elements being excluded, unless specifically stated otherwise. Although terms such as "first," "second," "third" "A," "B," (a), and (b) may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

It should be noted that if it is described that one component is "connected", "coupled", or "joined" to another component, a third component may be "connected", "coupled", and "joined" between the first and second components, although the first component may be directly connected, coupled, or joined to the second component. However, if the specification states that a first component is "directly connected" or "directly joined" to a second component, a third component may not be "connected" or "joined" between the first component and the second component. Similar expressions, for example, "between" and "immediately between" and "adjacent to" and "immediately adjacent to," are also to be construed in this manner.

The terminology used herein is for describing various examples only, and is not to be used to limit the disclosure or claims. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The use of the term 'may' herein with respect to an example or embodiment, e.g., as to what an example or embodiment may include or implement, means that at least one example or embodiment exists where such a feature is included or implemented while all examples and embodiments are not limited thereto.

FIG. 1 is a diagram illustrating an example of a user verification apparatus using a generalized user model.

Referring to FIG. 1, a user verification apparatus 100 receives input data and generates output data by processing the received input data. The input data may correspond to an indicia used for identification, such as, for example, input voice, input biometric information, or an input image. For example, in a case of speaker verification, the input data may include a voice or an audio, and may be referred to as speech data. In a case of face verification, the input data may include a face image. In a case of fingerprint verification, the input data may include a fingerprint image. In a case of iris verification, the input data may include an iris image.

The input data may be input by a test user attempting user verification. The user verification apparatus 100 generates a result of verification of the test user by processing the input data. Output data may include a result of the verification the test user generated by the user verification apparatus 100. For example, the verification result may indicate a verification success or indicate a verification failure.

In an example, the user verification apparatus 100 uses a feature extractor 110 and comparators 120 and 130 to perform the user verification. Each of the feature extractor 110, the comparator 120, and the comparator 130 may be implemented on a hardware module. For example, each of the feature extractor 110, the comparator 120, and the comparator 130 may be implemented as a neural network on an appropriate hardware.

In an example, the neural network may correspond to a recurrent neural network (RNN) or a convolutional neural network (CNN). In an example, the CNN may be a deep neural network (DNN). Ain an example, the DNN may include a fully-connected network (FCN), a deep convolutional network (DCN), a long-short term memory (LSTM) network, and a grated recurrent units (GRUs). The DNN may include a plurality of layers. The plurality of layers may include an input layer, at least one hidden layer, and an output layer. In an example, neural network may include a sub-sampling layer, a pooling layer, a fully connected layer, etc., in addition to a convolution layer.

The neural network may map input data and output data that have a nonlinear relationship based on deep learning to perform tasks such as, for example, object classification, object recognition, audio or speech recognition, and image recognition. The deep learning may be a type of machine learning that is applied to perform image recognition or speech recognition from a big dataset. The deep learning may be performed in supervised and/or unsupervised manners, which may be applied to perform the mapping of input data and output data.

The neural network may be trained to perform a desired operation by mapping input data and output data that have a nonlinear relationship therebetween through deep learning to perform tasks such as, for example, object classification, object recognition, audio or speech recognition, and image recognition. The deep learning is a machine learning method used to solve a problem given from a big dataset. The deep learning may also be construed as a problem-solving process for optimization to find a point where energy is minimized while training the neural network using provided training data. Through the deep learning, for example, supervised or unsupervised learning, a weight corresponding to an architecture or a model of the neural network may be obtained, and the input data and the output data may be mapped to each other based on the obtained weight.

In an example, the neural network may be implemented as an architecture having a plurality of layers including an input image, feature maps, and an output. In the neural network, a convolution operation between the input image, and a filter referred to as a kernel, is performed, and as a result of the convolution operation, the feature maps are output. Here, the feature maps that are output are input feature maps, and a convolution operation between the output feature maps and the kernel is performed again, and as a result, new feature maps are output. Based on such repeatedly performed convolution operations, results of recognition of characteristics of the input image via the neural network may be output.

In another example, the neural network may include an input source sentence, (e.g., voice entry) instead of an input image. In such an example, a convolution operation is performed on the input source sentence with a kernel, and as a result, the feature maps are output. The convolution operation is performed again on the output feature maps as input feature maps, with a kernel, and new feature maps are output. When the convolution operation is repeatedly performed as such, a recognition result with respect to features of the input source sentence may be finally output through the neural network.

The feature extractor 110 generates a test feature vector corresponding to the test user based on input data that is input by the test user. The feature extractor 110 generates the test feature vector by extracting at least one feature from the input data. For example, in the case of speaker verification, the feature extractor 110 extracts a feature from speech data input by the test user and generates a test feature vector corresponding to the test user. The test feature vector includes information for identifying the test user. In an example, the feature extractor 110 includes a neural network trained to extract features from a network input.

The comparator 120 determines a first parameter indicating a similarity between the test feature vector and an enrolled feature vector and outputs the determined first parameter. The first parameter increases as a distance between the test feature vector and the enrolled feature vector decreases. The comparator 120 includes a neural network trained to output a similarity between the enrolled feature vector and a network input.

In an example, the enrolled feature vector is enrolled for the user verification in advance. For example, the enrolled feature vector may be enrolled by an enrolled user and include information for identifying the enrolled user. The enrolled feature vector may include at least one feature extracted from enrolled data that is input to enroll the enrolled user. In an example, the data is input by the enrolled user. In the case of speaker verification, an enrolled feature vector corresponding to an enrolled user is generated by extracting a feature from speech data input by the enrolled user. When it is determined that the test user matches the enrolled user, a verification of the test user is successful. When it is determined that the test user does not match the enrolled user, the verification of the test user fails.

The comparator 130 determines a second parameter indicating a similarity between the test feature vector and a user model corresponding to generalized users and outputs the determined second parameter. The second parameter increases as a distance between the test feature vector and the user model decreases. The user model includes data corresponding to the generalized users. The user model includes generalized feature vectors corresponding to the generalized users. The similarity between the test feature vector and the user model is determined based on distances between the test feature vector and the generalized feature vectors.

For example, data corresponding to the generalized users may be constructed based on at least a portion of data corresponding to a population of users. The user model may correspond to people other than the test user, that is, other users. The comparator 130 includes a neural network trained to output a similarity between the user model and a network input. The data corresponding to the generalized users corresponds to training data used in a process of training the neural network included in the comparator 130.

Depending on an example, the user model may be stored as generalized feature vectors, stored as a cluster into which the generalized feature vectors are clustered, stored as a GMM, or stored through an application to a neural network. Clustering, GMM, and user model-based neural networks will be described in detail later.

The user verification apparatus 100 generates a verification result of the test user based on the first parameter and the second parameter. In an example, the user verification apparatus 100 determines a confidence score based on the first parameter and the second parameter and generates the verification result of the test user by comparing the confidence score and a threshold. In an example, when the confidence score is higher than the threshold, a verification result indicating a verification success is generated. In an example, when the confidence score is lower than the threshold, a verification result indicating a verification failure is generated. In an example, when the confidence score is equal to the threshold, whether a verification is to be processed as success or failure is determined by policy.

In the user verification, not only the enrolled feature vector but also the user model is taken into consideration, so that a verification result matching a characteristic of the test user is generated. In other words, a variable verification condition may be applied for each test user. In an example, when the test user has a general characteristic, the user model may be present at a distance close to the test feature vector, and thus, a tight verification condition may be applied to the test user. In another example, when the test user has a unique characteristic, the user model may be present at a distance far from the test feature vector, and thus, a loose verification condition may be applied to the test user.

User identification is a process of determining a test user. User verification is a process of determining whether a test user matches an enrolled user. Generally, a neural network trained in view of the user identification is used in the user verification. In this case, a characteristic obtained based on the user verification is not applied to a verification process. In the present disclosure, however, a reliability of the user verification may be improved by considering a relationship between a test user and another user through the user model in the user verification.

Figure 2:
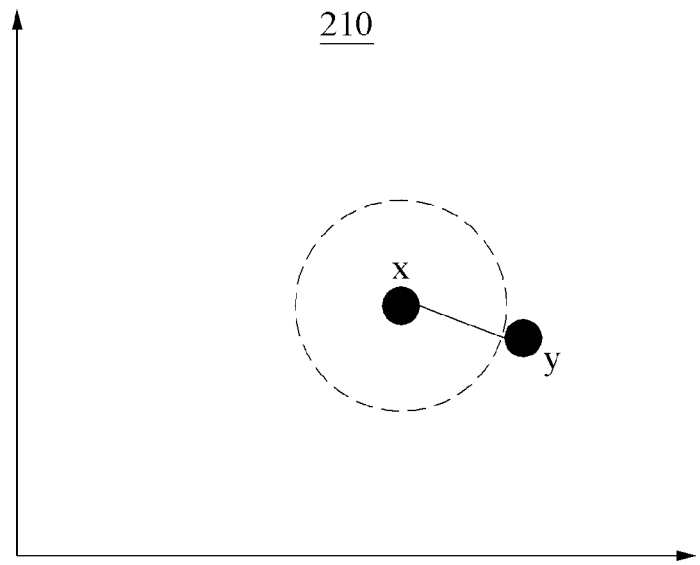
FIG. 2 illustrates an example of a threshold adjustment.
Figure 2:
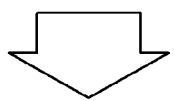
Figure 2:
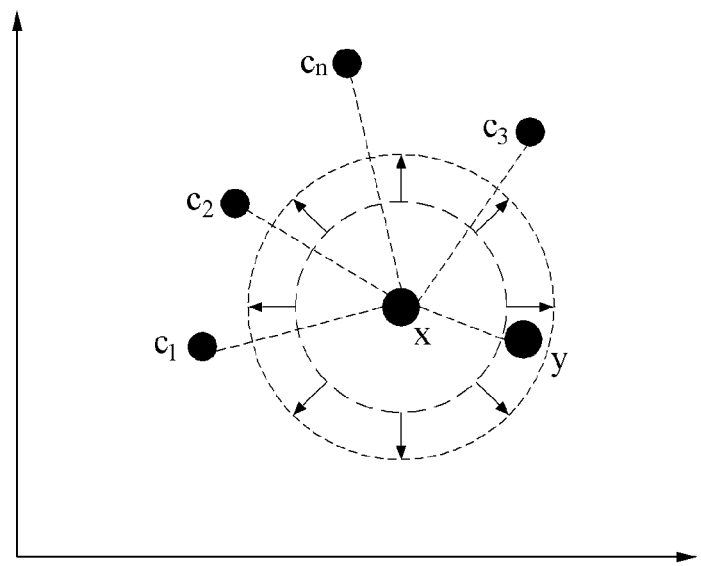

FIG. 2 is a diagram illustrating an example of controlling a verification condition.

Referring to FIG. 2, a fixed verification condition is applied to a case 210 and a variable verification condition is applied to a case 220. In the case 210, a distance between a test feature vector x and an enrolled feature vector y does not satisfy a verification condition and thus, verification using the test feature vector x fails.

In the case 220, similarities between the test feature vector x and generalized feature vectors $c_1$ through $c_n$ corresponding to a user model are relatively low and a verification condition is relaxed accordingly. Thus, in case 220, a distance between the test feature vector x and the enrolled feature vector y satisfies the verification condition, and verification using the test feature vector x is successful. According to the case 220, unnecessary verification attempts of a legitimate test user corresponding to the enrolled user may be reduced.

In an example, the verification condition may include a confidence score higher than a threshold. In an example, a second parameter indicating a similarity between a test feature vector and a user model is applied to the confidence score or applied to the threshold. As the second parameter increases, for example, as a distance between the test feature vector and the user model decreases, the confidence score decreases and the threshold increases. Since a probability of a verification success decreases as the confidence score decreases and the threshold increases, it can be seen that the verification condition is tightened. Conversely, since the probability of the verification success increases as the confidence score increases and the threshold decreases, it can be seen that the verification condition is relaxed. In an example, the confidence score is expressed by Equation 1.

confidence score=$P(\theta|x)$ [Equation 1]

Equation 1 represents a posterior probability for a test user x and an overall user model θ including an enrolled user and a generalized user. In an example, equation 1 can be expressed as Equation 2.

$$= \frac{P(x|\theta)P(\theta)}{\sum_\theta P(x|\theta)P(\theta)} \approx \frac{P(x|\theta)}{\sum_\theta P(x|\theta)} \approx \frac{P(x|\theta_c)}{\sum_{n=1}^{k} P(x|\theta_n)}$$ [Equation 2]

In an example, a user verification apparatus determines the confidence score based on a last term of Equation 2. The last term of Equation 2 is rewritten as Equation 3.

$$\frac{P(x|\theta_c)}{\sum_{n=1}^{k} P(x|\theta_n)}$$ [Equation 3]

In Equation 3, a numerator $P(x|\theta_c)$ denotes a posterior probability that the test user x corresponds to an enrolled user $\theta_c$ when the enrolled user $\theta_c$ exists. In an example, the test user x corresponds to a test feature vector and the enrolled user $\theta_c$ corresponds to an enrolled feature vector.

In Equation 3, a denominator $\Sigma_{n=1}^{k} P(x|\theta_n)$ denotes a posterior probability that the test user x corresponds to a user model $\theta_n$ when the user model $\theta_n$ exists. In an example, the user model $\theta_n$ corresponds to a user other than the test user x. The user model $\theta_n$ corresponds to the generalized feature vectors $c_1$ through $c_n$.

$P(x|\theta_c)$ corresponds to a similarity between the test feature vector and the enrolled feature vector or corresponds to a distance between the test feature vector and the enrolled feature vector. For example, $P(x|\theta_c)$ may be determined based on a cosine distance between the test feature vector and the enrolled feature vector. The distance is a concept corresponding to a difference, and the similarity and the distance may be inversely proportional to each other. As the similarity between the test feature vector and the enrolled feature vector increases or as the distance between the test feature vector and the enrolled feature vector decreases, a value of $P(x|\theta_c)$ increases. Likewise, $\Sigma_{n=1}^{k} P(x|\theta_n)$ corresponds to similarities or distances between the test feature vectors and the generalized feature vectors.

For ease and convenience, $P(x|\theta_c)$ and $\Sigma_{n=1}^{k} P(x|\theta_n)$ will be described based on a concept of similarity. For example, in the following description, $P(x|\theta_c)$ corresponds to the first parameter indicating the similarity between the test feature vector and the enrolled feature vector, and $\Sigma_{n=1}^{k} P(x|\theta_n)$ corresponds to the second parameter indicating the similarity between the test feature vector and the user model.

According to Equation 3, the verification condition is expressed by Equation 4.

$$\frac{P(x|\theta_c)}{\sum_{n=1}^{k} P(x|\theta_n)} > TH$$ [Equation 4]

In Equation 4, TH denotes a threshold. Equation 4 represents a case in which the second parameter is applied to the confidence score. According to Equation 4, the confidence score increases as the similarity between the test feature vector corresponding to the test user x and the enrolled feature vector corresponding to the enrolled user $\theta_c$ increases, and decreases as the similarity between the test feature vector and the user model $\theta_n$ increases.

According to Equation 4, since the probability of the verification success decreases as the second parameter increases, it can be seen that the verification condition is tightened. Also, since the probability of the verification success increases as the second parameter decreases, it can be seen that the verification condition is relaxed. According to Equation 4, the user verification apparatus determines the confidence score based on the first parameter and the second parameter and generates a verification result of the test user by comparing the confidence score and the threshold. Equation 4 can be expressed as Equation 5.

$P(x|\theta_c) > TH * \Sigma_{n=1}^{k} P(x|\theta_n)$ [Equation 5]

Equation 5 represents a case in which the second parameter is applied to the threshold. According to Equation 5, the threshold increases as the similarity between the test feature vector corresponding to the test user x and the user model $\theta_n$ increases.

A right hand side of Equation 5, $TH * \Sigma_{n=1}^{k} P(x|\theta_n)$ may be defined as a new threshold. According to Equation 5, since the probability of the verification success decreases as the second parameter increases, it can be seen that the verification condition is tightened. Also, since the probability of the verification success increases as the second parameter decreases, it can be seen that the verification condition is relaxed. According to Equation 5, the user verification apparatus determines the threshold based on the second parameter and generates the verification result of the test user by comparing the confidence score corresponding to the first parameter and the determined threshold.

Figure 3:
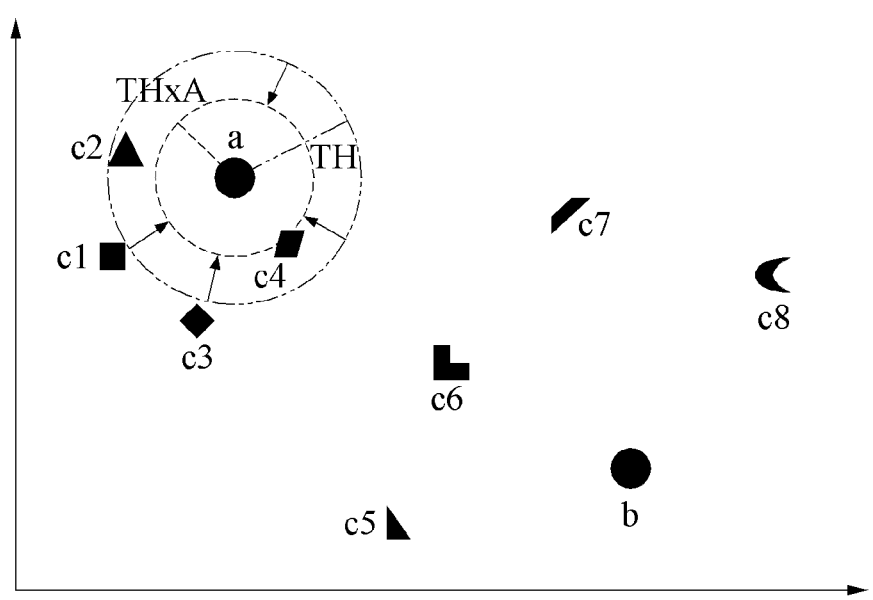
FIG. 3 illustrates an example of a threshold increase.

FIG. 3 is a diagram illustrating an example of tightening a verification condition. FIG. 3 illustrates an enrolled feature vector a and generalized feature vectors c1 through c8. The generalized feature vectors c1 through c8 correspond to a user model. Because similarities between the enrolled feature vector a and the generalized feature vectors c1 through c4 are relatively high, a verification condition is tightened.

For example, an original threshold TH may be adjusted to a new threshold TH*A based on a correction factor A. The threshold TF of FIG. 3 may correspond to the threshold of Equation 4 and Equation 5. The correction factor A of FIG. 3 may correspond to $\Sigma_{n=1}^{k} P(x|\theta_n)$ of Equation 5. In an example, the correction factor A may be a real number greater than 1 and may increase the original threshold TH. Since a probability of a verification success decreases when the original threshold TH increases due to the correction factor A, it can be seen that the verification condition is tightened.

Figure 4:
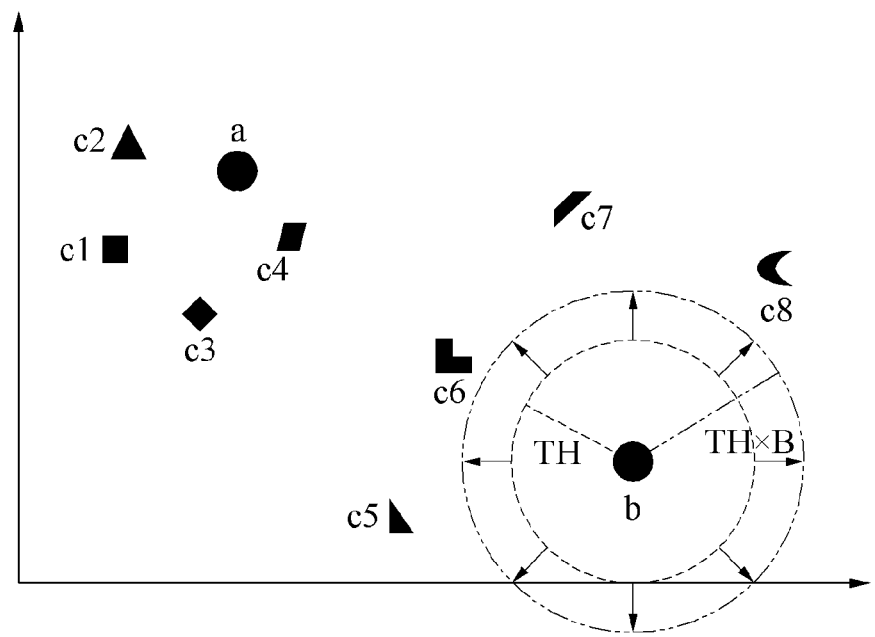
FIG. 4 illustrates an example of a threshold decrease.

FIG. 4 is a diagram illustrating an example of relaxing a verification condition. FIG. 4 illustrates an enrolled feature vector b and generalized feature vectors c1 through c8. Because similarities between the enrolled feature vector b and neighboring generalized feature vectors c5 through c8 are relatively low, a verification condition is relaxed.

For example, an original threshold TH may be adjusted to a new threshold TH*B based on a correction factor B. The threshold TF of FIG. 4 may correspond to the threshold of Equation 4 and Equation 5. The correction factor B of FIG. 4 may correspond to $\Sigma_{n=1}^{k} P(x|\theta_n)$ of Equation 5. For example, the correction factor B may be a real number less than 1 and may reduce the original threshold TH. Since a probability of a verification success increases when the original threshold TH decreases due to the correction factor B, it can be seen that the verification condition is relaxed.

Figure 5:
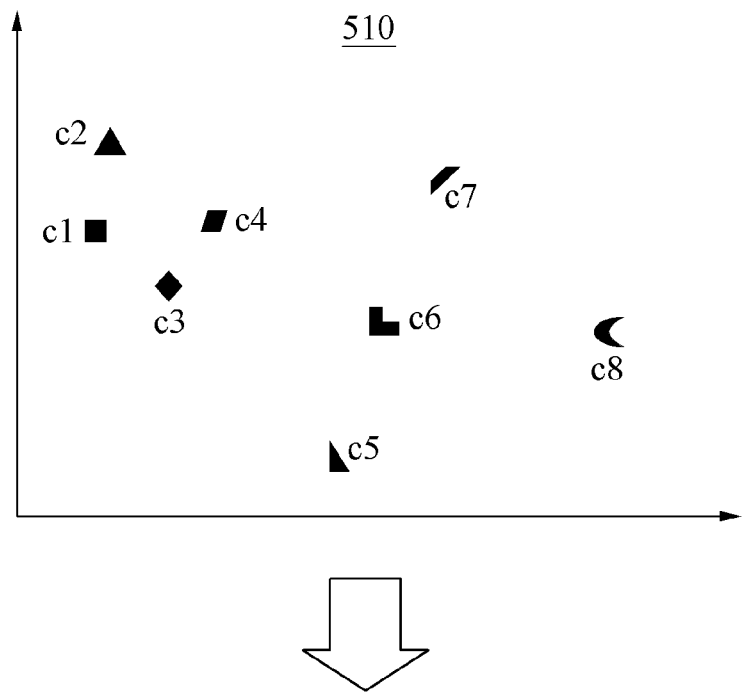
FIG. 5 illustrates an example of a clustering-based discrete user model.
Figure 5:
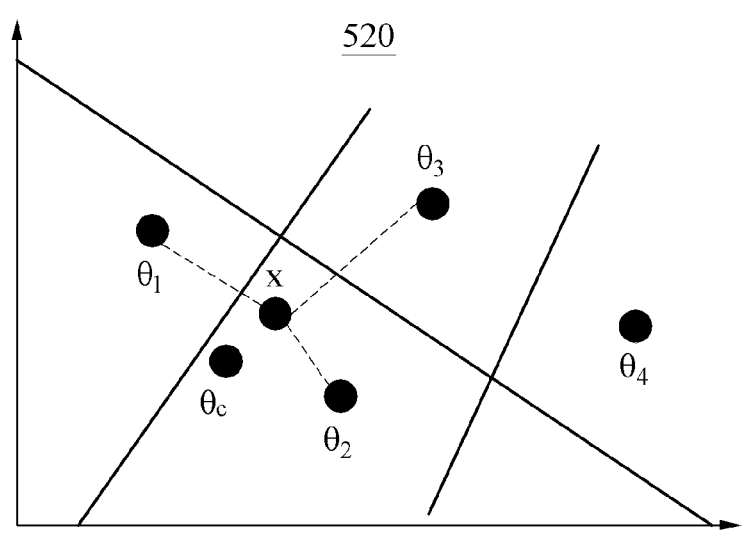

FIG. 5 is a diagram illustrating an example of a clustering-based discrete user model. FIG. 5 illustrates an original user model 510 and a clustered user model 520.

The original user model 510 includes generalized feature vectors c1 through c8. Although FIG. 5 illustrates eight feature vectors c1 through c8, a number of feature vectors included in the original user model 510 is not limited thereto. The feature vectors c1 through c8 are clustered into feature clusters θ1 through θ4 to reduce a computing load that is consumed to process operations associated with a plurality of feature vectors.

Also, a portion of the feature clusters θ1 through θ4 are selected as representative feature clusters θ1 through θ3 to be used for determining a second parameter. A number of feature clusters among the feature clusters θ1 through θ4 are selected as the representative feature clusters θ1 through θ3 in an order of adjacency to a test feature vector x. In an example, when a number of feature vectors may be 55000, a number of feature clusters may be 10, 50, or 100, and a number of representative feature clusters may be 5.

In an example, a user verification apparatus selects at least a portion of the feature clusters θ1 through θ4 to be the representative feature clusters θ1 through θ3 based on similarities between the test feature vector x and the feature clusters θ1 through θ4. In an example, the user verification apparatus determines the second parameter based on similarities between the test feature vector x and the representative feature clusters θ1 through θ3. For example, the user verification apparatus determines the second parameter by inserting the representative feature clusters θ1 through θ3 as the user model θ$_n$ in the denominator $\Sigma_{n=1}^{k}P(x|\theta_n)$ of Equation 3. The user verification apparatus determines the confidence score by calculating the numerator $P(x|\theta_c)$ of Equation 3 based on the test feature vector x and the enrolled feature vector θ$_c$.

Figure 6:
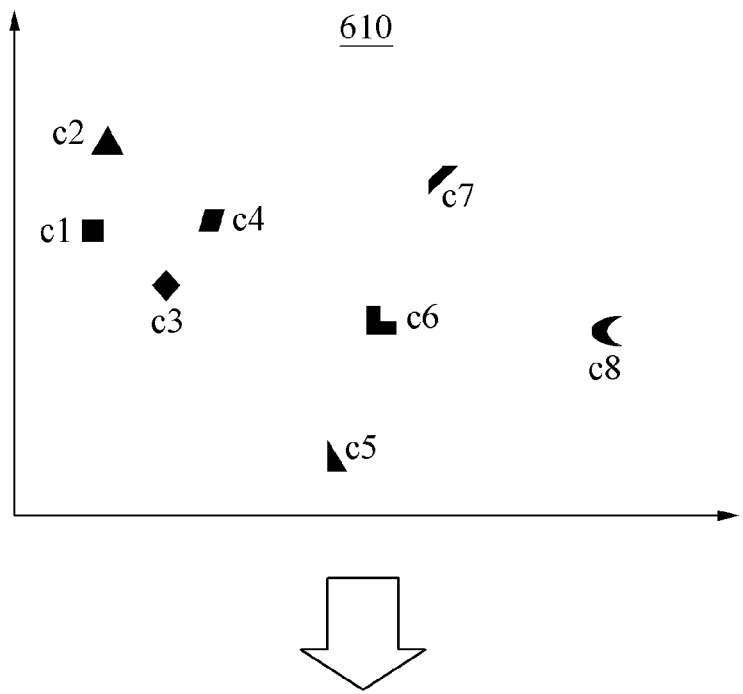
FIG. 6 illustrates an example of a Gaussian mixture model (GMM)-based continuous user model.
Figure 6:
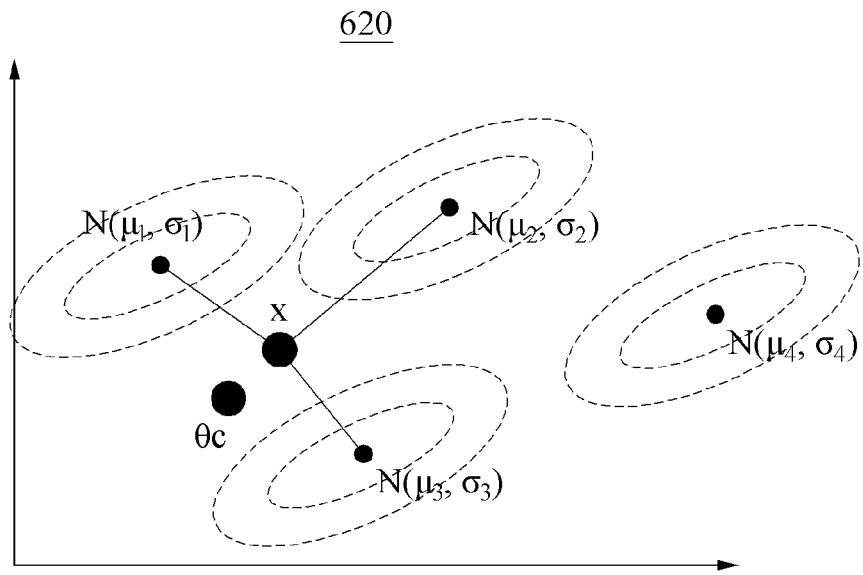

FIG. 6 is a diagram illustrating an example of a GMM-based continuous user model. FIG. 6 illustrates an original user model 610 and a GMM 620. The GMM 620 includes a Gaussian distribution $N(\mu_n, \sigma_1)$ where μ denotes an average and a denotes a standard deviation. In the example of FIG. 6, the GMM 620 includes a first Gaussian distribution $N(\mu_1, \sigma_1)$ through a fourth Gaussian distribution $N(\mu_4, \sigma_4)$. The first Gaussian distribution $N(\mu_1, \sigma_1)$ through the fourth Gaussian distribution $N(\mu_4, \sigma_4)$ correspond to a distribution of generalized feature vectors c1 through c8. A user verification apparatus determines a second parameter based on a test feature vector x and the GMM 620. For example, the user verification apparatus determines the second parameter by calculating the denominator $\Sigma_{n=1}^{k}P(x|\theta_n)$ of Equation 3 using the Gaussian distributions and the test feature vector x. The user verification apparatus determines a confidence score by calculating the numerator $P(x|\theta_c)$ of Equation 3 based on the test feature vector x and an enrolled feature vector θ$_c$.

Figure 7:
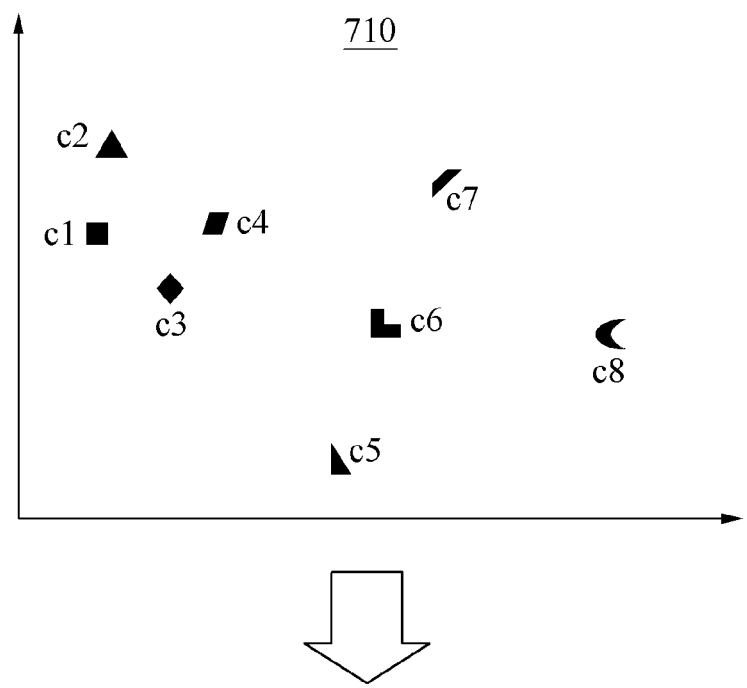
FIG. 7 illustrates an example of a user model-based neural network.
Figure 7:
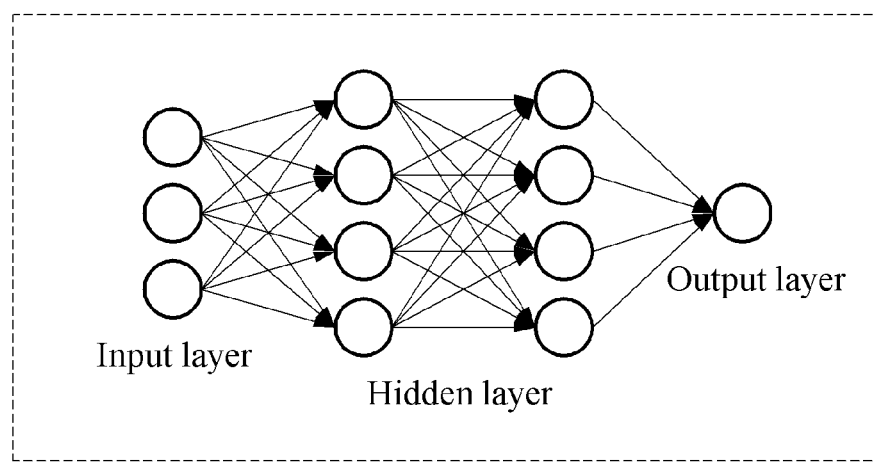

FIG. 7 is a diagram illustrating an example of a user model-based neural network. FIG. 7 illustrates a user model 710 and a neural network 720 trained based on the user model 710. The neural network 720 is trained to output a similarity between a network input and the user model 710. For example, the network input may be trained to output similarities between the network input and generalized feature vectors c1 through c8 included in the user model 710.

In this example, the neural network 720 may correspond to the comparator 130 of FIG. 1, and an output of the neural network 720 may correspond to the denominator $\Sigma_{n=1}^{k}P(x|\theta_n)$ of Equation 3. The user verification apparatus inputs a test feature vector to the neural network 720 and acquires a second parameter corresponding to an output of the neural network 720.

Figure 8:
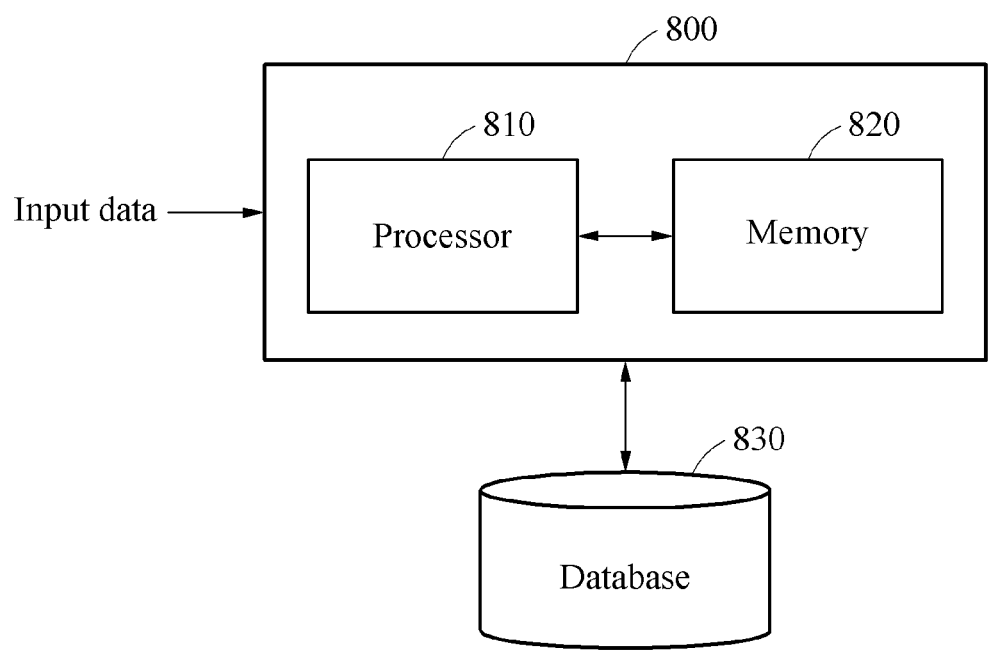
FIG. 8 is a diagram illustrating an example of a user verification apparatus.

FIG. 8 is a diagram illustrating an example of a user verification apparatus.

Referring to FIG. 8, a user verification apparatus 800 receives input data. In a case of speaker verification, the user verification apparatus 800 may also be referred to as a speaker verification apparatus. The input data may correspond to an input voice or an input image. The user verification apparatus 800 processes the input data using a neural network. For example, the user verification apparatus 800 may process a verification operation on the input data using the neural network. A database 830 stores an enrolled feature vector and a user model. A processor 810 uses the enrolled feature vector and the user model stored in the database 830 to perform user verification. In an example, the user model may be stored through clustering, stored as a GMM, or stored as the neural network 720 of FIG. 7.

The user verification apparatus 800 performs at least one of the operations described herein for user verification, and provides a user with a result of the user verification. In an example, the result of the user verification is provided by an audio or video feedback through an input/output module (not shown). The user verification apparatus 800 includes at least one processor 810 and a memory 820. The memory 820 is connected to the processor 810, and stores instructions executable by the processor 810, and data to be calculated by the processor 810 or data processed by the processor 810. The memory 820 may include a non-transitory computer-readable medium, for example, a high-speed random-access memory (RAM), and/or a nonvolatile computer-readable storage medium, for example, at least one disk storage device, flash memory device, and other nonvolatile solid-state memory devices. Further details regarding the memory 820 is provided below.

The processor 810 refers to a data processing device configured as hardware with a circuitry in a physical structure to execute desired operations. For example, the desired operations may include codes or instructions included in a program. For example, the data processing device configured as hardware may include a microprocessor, a central processing unit (CPU), a processor core, a multicore processor, a reconfigurable processor, a multiprocessor, an application-specific integrated circuit (ASIC), a field programmable gate array (FPGA), a graphics processor unit (GPU), or any other type of multi- or single-processor configuration.

The processor 810 executes instructions to perform at least one of the operations described above with reference to FIGS. 1 through 7. For example, the processor 810 generates a test feature vector corresponding to a test user based on input data input by the test user, determine a first parameter indicating a similarity between the test feature vector and an enrolled feature vector enrolled for user verification, determine a second parameter indicating a similarity between the test feature vector and a user model corresponding to generalized users, and generates a verification result of the test user based on the first parameter and the second parameter. Further details regarding the processor 810 is provided below.

Figure 9:
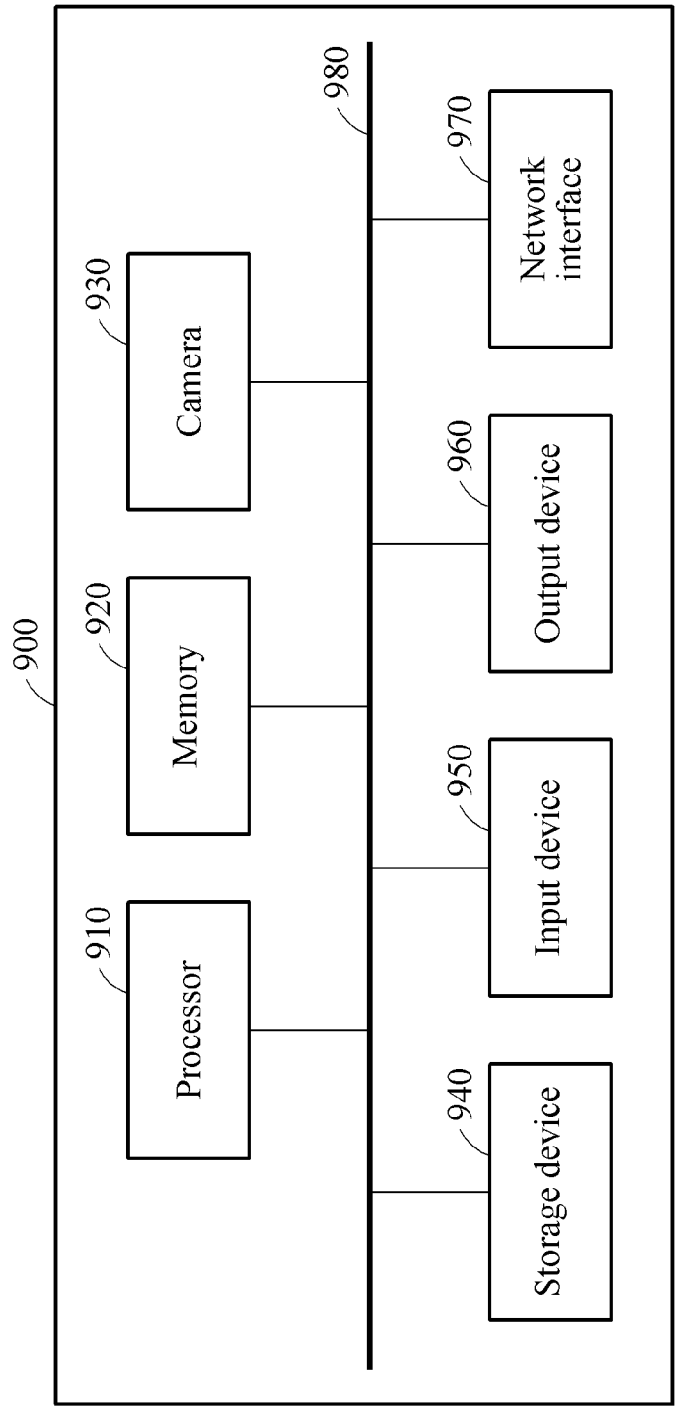
FIG. 9 is a diagram illustrating an example of an electronic device.

FIG. 9 is a diagram illustrating an example of an electronic device incorporating a user verification apparatus.

Referring to FIG. 9, an electronic device 900 receives input data and processes a user verifying operation associated with the input data. The electronic device 900 uses the above-described user model to process the user verifying operation. The electronic device 900 may include the user verification apparatus described with reference to FIGS. 1 through 8, or perform functions of the user verification apparatus described with reference to FIGS. 1 through 8.

In an example, the electronic device 900

The electronic device 900 includes a processor 910, a memory 920, a camera 930, a storage device 940, an input device 950, an output device 960, and a network interface 970. The processor 910, the memory 920, the camera 930, the storage device 940, the input device 950, the output device 960, and the network interface 970 may communicate with one another through a communication bus 980.

The processor 910 refers to a data processing device configured as hardware with a circuitry in a physical structure to execute desired operations. For example, the desired operations may include codes or instructions included in a program. For example, the data processing device configured as hardware may include a microprocessor, a central processing unit (CPU), a processor core, a multicore processor, a reconfigurable processor, a multiprocessor, an application-specific integrated circuit (ASIC), a field programmable gate array (FPGA), a graphics processor unit (GPU), or any other type of multi- or single-processor configuration. The processor 910 executes functions and instructions in the electronic device 900. For example, the processor 910 may process instructions stored in the memory 920 or the storage device 940. The process 910 performs at least one of the operations described above with reference to FIGS. 1 through 8. Further details regarding the process 910 is provided below.

The memory 920 stores information used for performing user verification. The memory 920 includes a computer-readable storage medium or a computer-readable storage device. The memory 920 stores instructions to be executed by the processor 910, and stores related information while a software program or an application is being executed by the electronic apparatus 900. Further details regarding the memory 920 is provided below.

The camera 930 captures a still image, a video image, or both the images. The camera 930 captures an image of a face region input by a user for face verification. In an example, the camera 930 provides a three-dimensional (3D) image including depth information of objects.

The storage device 940 includes a computer-readable storage medium or a computer-readable storage device. The storage device 940 stores a database including information used for processing the user verification, such as, for example, an enrolled feature vector and a user model. For example, the storage device 940 may store a greater amount of information for a longer period of time, compared to the memory 920. The storage device 940 may include, for example, a magnetic hard disk, an optical disc, a flash memory, a floppy disk, and other types of nonvolatile memory that are well-known in the related technical fields. Further details regarding the storage device 940 is provided below.

The input device 950 receives an input from a user through a traditional input method, for example, a keyboard and a mouse, and a new input method, for example, a touch input, a voice input, and an image input. The input device 950 may include, for example, a keyboard, a mouse, a touchscreen, a microphone, and other devices that may detect an input from a user and transmit the detected input to the electronic apparatus 900.

The output device 960 provides an output of the electronic apparatus 900 to a user through a visual, auditory, or tactile channel. The output device 960 may include, for example, a display, a touchscreen, a speaker, a vibration generator, and other devices that may provide an output to a user. The network interface 970 communicates with an external device through a wired or wireless network.

In an example, the input device 950 and the output device 960 may be a display that receives an input from a user or provides an output. The user interface is a physical structure that includes one or more hardware components that provide the ability to render a user interface, render a display, and/or receive user input. However, the input device 950 and the output device 960 are not limited to the example described above, and any other displays, such as, for example, computer monitor and eye glass display (EGD) that are operatively connected to the electronic device 900 may be used without departing from the spirit and scope of the illustrative examples described.

FIG. 10 is a diagram illustrating an example of a user verification method. The operations in FIG. 10 may be performed in the sequence and manner as shown, although the order of some operations may be changed or some of the operations omitted without departing from the spirit and scope of the illustrative examples described. Many of the operations shown in FIG. 10 may be performed in parallel or concurrently. One or more blocks of FIG. 10, and combinations of the blocks, can be implemented by special purpose hardware-based computer, such as a processor, that perform the specified functions, or combinations of special purpose hardware and computer instructions. In addition to the description of FIG. 10 below, the descriptions of FIGS. 1-9 are also applicable to FIG. 10, and are incorporated herein by reference. Thus, the above description may not be repeated here.

Referring to FIG. 10, in operation 1010, a user verification apparatus generates a test feature vector corresponding to a test user based on input data that is input by the test user. In operation 1020, the user verification apparatus determines a first parameter indicating a similarity between the test feature vector and an feature vector that is enrolled for user verification. In operation 1030, the user verification apparatus determines a second parameter indicating a similarity between the test feature vector and a user model corresponding to generalized users. In operation 1040, the user verification apparatus generates a verification result of the test user based on the first parameter and the second parameter. In a case of speaker verification, the user verification method may also be referred to as a speaker verification method. In this case, operations 1010 through 1040 may be performed by a speaker verification apparatus. The speaker verification apparatus extracts a feature from speech data input by a test user and generates a test feature vector corresponding to the test user in operation 1010.

User verification apparatus 100, feature extractor 110, comparators 120 and 130, user verification apparatus 800, electronic device 900, and other apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of user verification. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, card type memory such as multimedia card, secure digital (SD) card, or extreme digital (XD) card, magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A user verification method comprising:
generating a feature vector corresponding to a user based on input data corresponding to the user;
determining a first similarity between the feature vector and an enrolled feature vector enrolled for user verification;
determining a second similarity between the feature vector and generalized feature vectors included in a generalized user model corresponding to generalized users; and
generating a verification result of the user based on the first similarity and the second similarity,
wherein the generating the verification result of the user comprising:
adjusting at least one of the first similarity and a threshold based on the second similarity; and
generating the verification result of the user by comparing the first similarity and the threshold,
wherein the determining of the second similarity comprises determining the second similarity based on a Gaussian mixture model (GMM) comprising the feature vector and Gaussian distributions, and
the Gaussian distributions correspond to a distribution of the generalized feature vectors representing the generalized users.

2. The user verification method of claim 1, wherein the generalized user model comprises feature clusters obtained by clustering the generalized feature vectors corresponding to the generalized users.

3. The user verification method of claim 2, wherein the determining of the second similarity comprises:
selecting a portion of the feature clusters as a representative feature cluster based on a similarity between the feature vector and each of the feature clusters; and
determining the second similarity based on a similarity between the feature vector and the representative feature cluster.

4. The user verification method of claim 1, wherein the determining of the second similarity comprises determining the second similarity using a neural network trained to output a similarity between a network input and the generalized user model.

5. The user verification method of claim 1, wherein the generating of the feature vector comprises generating the feature vector by extracting features from the input data using a neural network trained to extract features from an input.

6. The user verification method of claim 1, wherein the generating of the verification result of the user comprises:
determining a confidence score based on the first similarity and the second similarity; and
obtaining the verification result of the user by comparing the confidence score and a threshold.

7. The user verification method of claim 6, wherein the confidence score increases in response to an increase in the similarity between the feature vector and the enrolled feature vector and decreases in response to an increase in the similarity between the feature vector and the generalized user model.

8. The user verification method of claim 1, wherein the generating of the verification result of the user comprises:
determining a threshold based on the second similarity; and
generating the verification result of the user by comparing a confidence score corresponding to the first similarity and the threshold.

9. The user verification method of claim 8, wherein the threshold increases, in response to an increase in the similarity between the feature vector and the generalized user model.

10. The user verification method of claim 1, wherein the first similarity increases in response to a decrease in a distance between the feature vector and the enrolled feature vector, and the second similarity increases in response to a decrease in a distance between the feature vector and the user model.

11. A non-transitory computer-readable storage medium storing instructions that, when executed by a processor, cause the processor to perform the user verification method of claim 1.

12. A speaker verification method comprising:
generating a feature vector corresponding to a user by extracting a feature from speech data corresponding to the user;
determining a first similarity between the feature vector and an enrolled feature vector enrolled for user verification;
determining a second similarity between the feature vector and generalized feature vectors included in a generalized user model corresponding to generalized users; and
generating a verification result of the user based on the first similarity and the second similarity,
wherein the generating the verification result of the user comprising:
adjusting at least one of the first similarity and a threshold based on the second similarity; and
generating the verification result of the user by comparing the first similarity and the threshold,
wherein the determining of the second similarity comprises determining the second similarity based on a Gaussian mixture model (GMM) comprising the feature vector and Gaussian distributions, and
the Gaussian distributions correspond to a distribution of the generalized feature vectors representing the generalized users.

13. The speaker verification method of claim 12, wherein the enrolled feature vector is based on speech data input by an enrolled user.

14. The speaker verification method of claim 13, wherein the feature vector comprises information for identifying the user, and the enrolled feature vector comprises information for identifying the enrolled user.

15. The speaker verification method of claim 13, wherein the generalized user model comprises feature clusters obtained by clustering the generalized feature vectors corresponding to the generalized users.

16. The speaker verification method of claim 12, wherein the determining of the second similarity comprises determining the second similarity using a neural network trained to output a similarity between a network input and the generalized user model.

17. The speaker verification method of claim 12, wherein the generating of the verification result of the user comprises:
determining a confidence score based on the first similarity and the second similarity; and
obtaining the verification result of the user by comparing the confidence score and a threshold.

18. The speaker verification method of claim 12, wherein the generating of the verification result of the user comprises:
- determining a threshold based on the second similarity; and
- generating the verification result of the user by comparing a confidence score corresponding to the first similarity and the threshold.

19. A user verification apparatus comprising:
a processor configured to:
- generate a feature vector corresponding to a user based on input data input by the user;
- determine a first similarity between the feature vector and an enrolled feature vector enrolled for user verification;
- determine a second similarity between the feature vector and generalized feature vectors included in a generalized user model corresponding to generalized users; and
- generate a verification result of the user based on the first similarity and the second similarity,
wherein, for the generating the verification result of the user, the processor is further configured to
- adjust at least one of the first similarity and a threshold based on the second similarity; and
- generate the verification result of the user by comparing the first similarity and the threshold,
wherein the determining of the second similarity comprises determining the second similarity based on a Gaussian mixture model (GMM) comprising the feature vector and Gaussian distributions, and the Gaussian distributions correspond to a distribution of the generalized feature vectors representing the generalized users.

20. The user verification apparatus of claim 19, wherein the generalized user model comprises feature clusters obtained by clustering the generalized feature vectors corresponding to the generalized users.

21. The user verification apparatus of claim 20, wherein the processor is further configured to select a portion of the feature clusters as a representative feature cluster based on a similarity between the feature vector and each of the feature clusters, and to determine the second similarity based on a similarity between the feature vector and the representative feature cluster.

22. The user verification apparatus of claim 19, wherein the processor is further configured to determine the second similarity using a comparator operating based on a neural network trained to output a similarity between a network input and the generalized user model.

23. The user verification apparatus of claim 19, wherein the processor is further configured to generate the feature vector by extracting features from the input data using a neural network trained to extract features from an input.

24. The user verification apparatus of claim 19, wherein the processor is further configured to determine a confidence score based on the first similarity and the second similarity, and to obtain the verification result of the user by comparing the confidence score and a threshold.

25. The user verification apparatus of claim 19, wherein the processor is further configured to determine a threshold based on the second similarity, and to generate the verification result of the user by comparing a confidence score corresponding to the first similarity and the threshold.

26. The apparatus of claim 19, further comprising a memory storing instructions that, when executed, configures the processor to generate the feature vector, to determine the first similarity, to determine the second similarity, and to generate the verification result.

27. A speaker verification apparatus comprising:
a processor, the processor configured to:
- generate a feature vector corresponding to a user by extracting a feature from speech data corresponding to the user;
- determine a first similarity between the feature vector and an enrolled feature vector enrolled for user verification;
- determine a second similarity between the feature vector and generalized feature vectors included in a generalized user model corresponding to generalized users; and
- generate a verification result of the user based on the first similarity and the second similarity,
wherein, for the generating the verification result of the user, the processor is further configured to:
- adjust at least one of the first similarity and a threshold based on the second similarity; and
- generate the verification result of the user by comparing the first similarity and the threshold, and
wherein the determining of the second similarity comprises determining the second similarity based on a Gaussian mixture model (GMM) comprising the feature vector and Gaussian distributions, and the Gaussian distributions correspond to a distribution of the generalized feature vectors representing the generalized users.

28. The speaker verification apparatus of claim 27, wherein the enrolled feature vector is based on speech data input by an enrolled user.

29. The apparatus of claim 27, further comprising a memory storing instructions that, when executed, configures the processor to generate the feature vector, to determine the first similarity, to determine the second similarity, and to generate the verification result.

30. An electronic device, comprising:
- a sensor configured to receive an input from a user;
- a memory configured to store the input, an enrolled feature vector for user verification, a generalized user model corresponding to generalized users, and instructions; and
- a processor configured to execute the instructions to
  - implement a feature extractor configured to extract a feature vector corresponding to the user from the input,
  - implement a first comparator configured to determine a first parameter indicating a similarity between the feature vector and the enrolled feature vector,
  - implement a second comparator configured to determine a second parameter indicating a similarity between the feature vector and generalized feature vectors included in the generalized user model, and
  - verify the user based on the first parameter and the second parameter,
wherein, for the generating the verification result of the user, the processor is further configured to:
- adjust at least one of the first similarity and a threshold based on the second similarity; and
- generate the verification result of the user by comparing the first similarity and the threshold, and
wherein the determining of the second similarity comprises determining the second similarity based on a Gaussian mixture model (GMM) comprising the feature vector and Gaussian distributions, and the Gaussian distributions correspond to a distribution of the generalized feature vectors representing the generalized users.

31. The electronic device of claim 30, wherein the processor is further configured to:
   determine a confidence score based on the first parameter and the second parameter; and
   verify the user based on a comparison of the confidence score with a threshold.

* * * * *